April 22, 1969

B. REICH ET AL 3,440,530

METHOD AND APPARATUS FOR MEASURING THE RESISTANCE OF AN
ELECTRICAL COMPONENT WHICH MAY BE SHUNTED BY
A SEMICONDUCTOR DEVICE

Original Filed June 19, 1961

INVENTORS
BERNARD REICH
MICHAEL A. BENANTI
WM. R. ORLOFF

BY Jacob Trachtman

ATTORNEY

| SCALE MULTIPLIER | $I_o$ AMPERES | $R_o$ OHMS | $I_o \times R_o$ VOLTS |
|---|---|---|---|
| X1 | $10^{-2}$ | 10 | 0.1 |
| X10 | $10^{-3}$ | 100 | 0.1 |
| X100 | $10^{-4}$ | 1000 | 0.1 |
| X1000 | $5 \times 10^{-5}$ | 10,000 | 0.5 |
| X10,000 | $5 \times 10^{-5}$ | 100000 | 5.0 |
FIG. 4
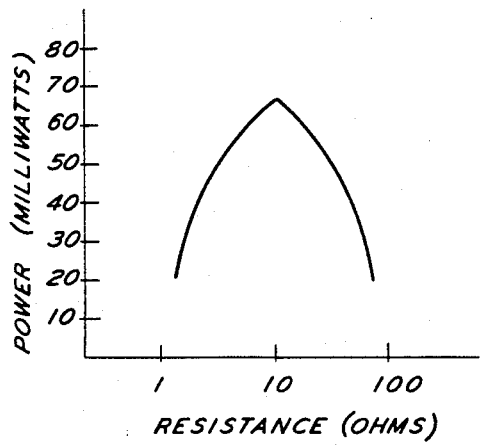
FIG. 5
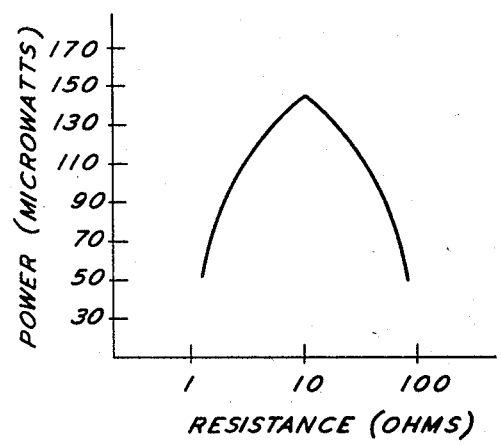
FIG. 6

United States Patent Office 3,440,530
Patented Apr. 22, 1969

3,440,530
METHOD AND APPARATUS FOR MEASURING THE RESISTANCE OF AN ELECTRICAL COMPONENT WHICH MAY BE SHUNTED BY A SEMICONDUCTOR DEVICE
Bernard Reich, Yonkers, Michael A. Benanti, Mamaroneck, and William R. Orloff, Tarrytown, N.Y., assignors to Molecular Electronics, Inc., New Rochelle, N.Y., a corporation of New York
Continuation of application Ser. No. 118,132, June 19, 1961. This application Nov. 22, 1966, Ser. No. 596,348
Int. Cl. G01r 27/14
U.S. Cl. 324—62                                  16 Claims

ABSTRACT OF THE DISCLOSURE

A method and apparatus for measuring the resistance of an electrical component which may be shunted by a semiconductor device which comprises the steps and apparatus for connecting a high impedance constant current source to current measuring means of low impedance, driving a constant current through said current measuring means to produce a voltage across said means which is too small to turn on any semiconductor device connected in circuit with said electrical component, placing the electrical component to be measured in parallel with said current measuring means, and measuring the new current flowing through said means; whereby the resistance of said electrical component is determined directly by the value of said new current, and no error is introduced by any semiconductor device connected to said electrical component.

---

This application is a continuation of our application Ser. No. 118,132, filed June 19, 1961, now abandoned.

This invention relates to a method and apparatus for the electrical measurement of resistance of components in or out of circuit. It enables the measurement of resistors by delivering merely microwatts of power to the component under test. Therefore, it will not endanger the operabiilty of active semiconductor devices which may be in the same circuit as the resistor.

The measurement and assessment of the condition of a resistor outside a particular circuit can be determined by an ohm's law measurement. However, when such a measurement is made, power from the tester is delivered to the component being tested. Furthermore, when the resistor is an integral part of a circuit which employs semiconductor devices, a portion of this power is delivered to the active semiconductor as well as the resistor being tested.

There is one commonly used technique of applying ohm's law to the measurement of approximate resistance. This is by the application of a constant voltage to the tester and associated circuitry and noting the difference in current through an ammeter when the unknown resistance is applied to the test circuit. This particular technique of making resistance measurements serves as the basis for most non-vacuum tube-type ohmmeters available on the market. The characteristics of these particular ohmmeters are such that the power delivered to the resistor or resistor-in-circuit combination ranges in the tens and possibly in the hundreds of milliwatts. One particular instrument which is currently in wide usage features a short circuit current of one-hundred milliamperes on the $R_x1$ scale and a maximum deliverable power of 50 milliwatts on this particular scale. It is known that instruments of this type can cause damage to semiconductor diodes when utilized, causing partial or complete destruction. Furthermore, by virtue of the inherent characteristics of these instruments, the value of resistance measured in the circuit may be altered by the presence of semiconductor devices since the test instrument can activate the junction of the semiconductor device causing a finite resistance to be placed in series or parallel with the unknown resistor.

It is a primary object of the present invention to eliminate the disadvantages and limitations of the prior art method for measuring ohmic resistance by the ohmmeter technique.

Another object is to provide a method and instrument of the non-vacuum tube-type which supplies one to two orders of magnitude less power to the particular component and circuit being tested.

It is another object of this invention to provide an instrument which can be used for measuring finite values of resistance in a circuit without the secondary loading of ancillary semiconductor devices.

Other and further objects and advantages of the present invention will become apparent from a consideration of the following description taken in connection with the appended drawings. These drawings include:

FIG. 4 is a table of the currents and voltages supplied by the instrument.

FIG. 5 is a graph wherein the power versus resistance of prior art devices is plotted.

FIG. 6 is a graph whereon the power versus resistance of the present invention is plotted.

Figure 1:
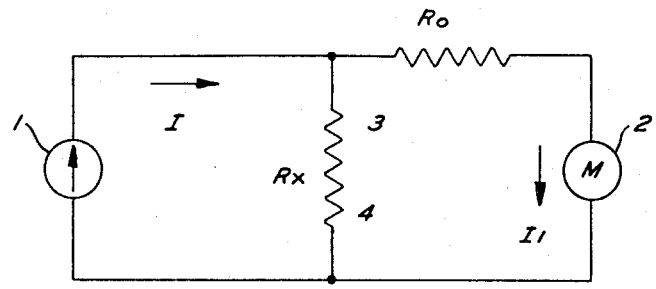
FIG. 1 is a simplified block diagram of the present invention.

In practicing our invention, the basic circuit subsequently described serves as the basis for measuring the values of unknown resistance. Referring to FIG. 1 in detail, generator 1, represents a variable constant current D.C. source. $R_o$ represents the effective resistance of the meter 2 and necessary added values. The unknown resistor, $R_x$, is placed across points 3 and 4. With resistance $R_x$ removed from the circuit, the generator current is adjusted until the meter current registers full scale deflection. Under these conditions, unknown resistance $R_x$ is placed across terminals 3 and 4. If the current through the meter with $R_x$ removed was $I_o$, then the current through the meter $I_M$, with $R_x$ applied can be expressed as:

$$I_M = I_o \frac{R_x}{R_o + R_x}$$

Figure 2:
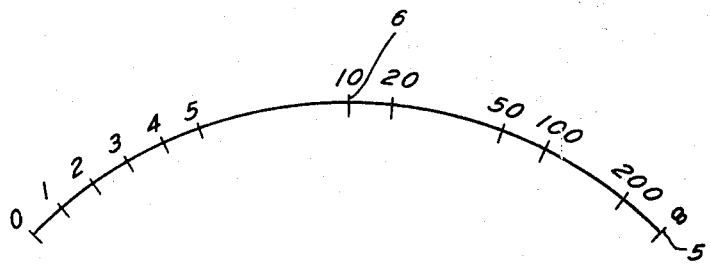
FIG. 2 is a sample meter scale of the present invention.

Referring to FIG. 2 the meter scale is depicted for one particular multiplying factor of our present invention. The scale has been calculated based on $R_o = 10$ ohms and $I_o = 10$ milliamperes. When $R_x$ is removed from the circuit of FIG. 1 the variable current source is adjusted until the meter reading is full scale or point 5. On this particular range when an $R_x = 10$ ohms is tested the meter reading would fall to point 6. By changing $R_o$, the meter scale can be made to read different values of resistance. Normally $R_o$ is varied in decades and scale multipliers in our present invention would be 1, 10, 100, 1000 and 10,000. Its value, on the first three meter ranges, ranges from say 10 to 1000 ohms. Resistances of that order may be considered as low resistances. They are insignificant when compared to resistances in the order of a megohm or more.

Figure 3:
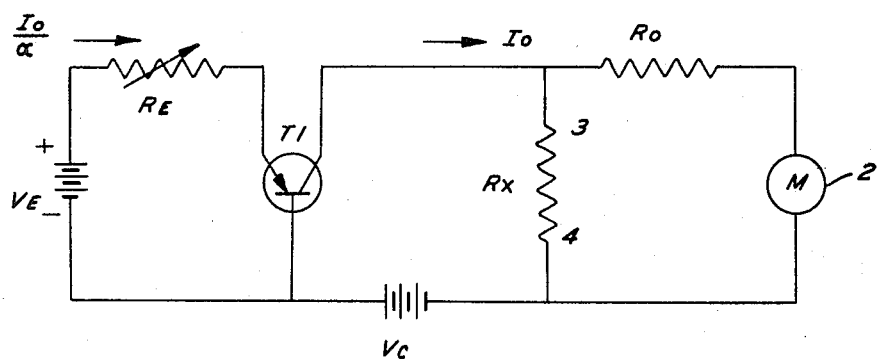
FIG. 3 is a diagram of the constant current source of the present invention.

The constant current source used in our invention which is referred to in FIG. 1, is described by referring to FIG. 3. It consists of two batteries $V_E$ and $V_c$, variable resistor, $R_E$, and transistor $T_1$. A current $I_o/\alpha$, determined primarily by battery $V_E$ and variable resistor $R_E$ is inserted into transistor $T_1$. Since the current gain of the transistor is $\alpha$, then the output current is $I_o$. The output impedance of the transistor, into which the unknown resistor, $R_x$, and $R_o$ combination look into, is in the order of several megohms. The output impedance of the constant current source can therefore be considered high. The functions of $R_x$, $R_o$ and meter 2 are identical to the functions of these components as described in FIG. 1. For the circuit of FIG. 3, the maximum voltage drop across terminals 3 and 4 is $I_oR_o$. The maximum current obtained by shorting terminals 3 and 4 is $I_o$. Typical values of $R_x$ and $I_o$ utilized in our invention and resultant open circuit voltage is described in FIG. 4 on the various scales of the instrument. From FIG. 4 the open circuit voltages of 0.1, 0.1, 0.1, 0.5 and 5.0 volts on the X1, X10, X100, X1000 and X10,000 scales respectively. On the X1, X10, and X100 scales the open circuit voltage of 0.1 volt is below the point where germanium and silicon diodes or transistors, which may appear across the unknown resistor, will conduct and therefore, will be of sufficiently high impedance not to effect the value of unknown resistance being tested. On the X1000 scale, only germanium units will be forward biased and silicon devices for the most part will be immune to turn-on or forward conduction because 0.6 volt is the normal threshold voltage for silicon diode or transistor forward turn-on.

Referring to FIG. 5 in which the ordinate refers to the power in milliwatts delivered to the components being tested and the abcissa to the value of unknown resistance of a prior art ohmmeter in common use by the industry. This plot is indicative of the maximum power deliverable on any range of the ohmmeter. The peak power is in the order of 50 milliwatts or $50 \times 10^{-3}$ watts.

In referring to FIG. 6, we note a similar plot of power delivered to the unknown resistor for our invention plotted as the ordinate, as a function of the unknown resistor plotted as the abcissa. This curve is indicative of the maximum power deliverable on any range of the ohmmeter. The peak power delivered by our invention is in the order of 150 microwatts or $150 \times 10^{-6}$ watts. Comparing our invention with prior art, it can be shown by a simple ratio of peak deliverable powers that our invention delivers, $$\frac{150 \times 10^{-6}}{50 \times 10^{-3}}$$

or .003 the power that prior art devices deliver.

Figure 7:
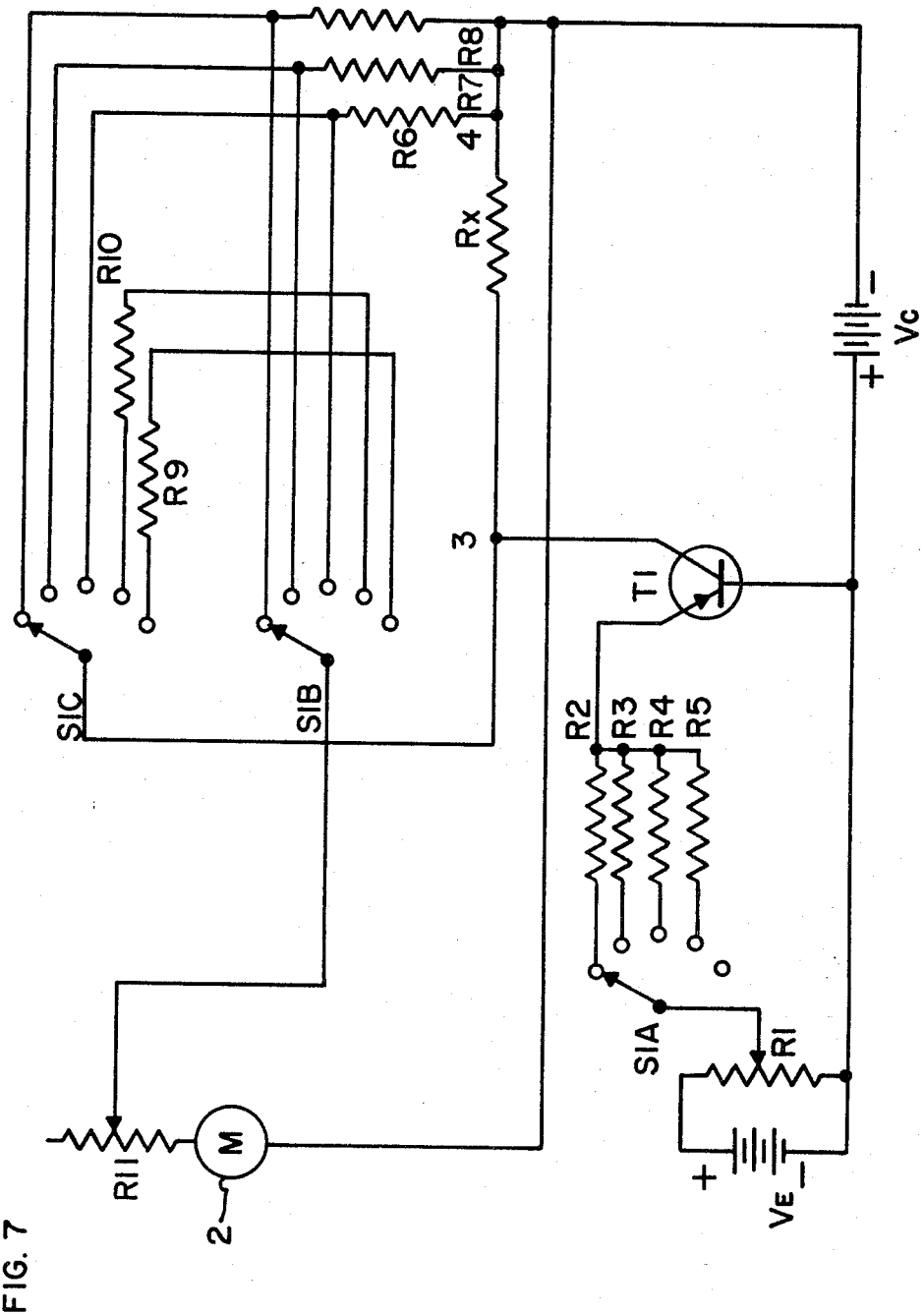
FIG. 7 is a schematic wiring diagram of the present invention.

Referring to FIG. 7, the schematic diagram of our invention will be described. The constant current source of the ohmmeter consists of batteries $V_E$ and $V_c$, transistor $T_1$, resistors $R_1$, $R_2$, $R_3$, $R_4$ and $R_5$. Switch $S_{1A}$ is used to grossly vary the output current of this supply and variable resistor $R_1$ is the fine adjustment. Poles $S_{1B}$ and $S_{1C}$ of the three pole, five position series resistances of the ohmmeter, $R_6$, $R_7$, $R_8$, $R_9$, and $R_{10}$ which are placed in series or parallel with the meter 2. Variable resistor $R_{11}$ is used to make up differences in meter resistances from ohmmeter to ohmmeter. Unknown resistor $R_x$ is placed between terminals 3 and 4 as indicated.

Thus it can be seen that by the use of the method and apparatus of our invention, that the unknown resistor being tested receives much less power from our invention than from prior art devices. In addition, the circuitry of our invention provides a method, on particular ranges, whereby the value of resistance can be measured without being influenced by the effects of forward biased semiconductor junctions.

What is claimed is:

1. The method of measuring the resistance of a selected electrical component while connected in circuit with one or more semiconductor devices which have a predetermined minimum threshold voltage for current conduction comprising the steps of
   connecting a high output impedance constant current source to current measuring means of low impedance,
   driving a constant current through said current measuring means to produce a voltage across said means which is less than the minimum threshold voltage required to turn on any semiconductor device connected in circuit with said electrical component,
   placing the electrical component to be measured in parallel with said current measuring means, and
   measuring the new current flowing through said means while said current source drives said constant current through the parallel combination of said means and said component;
   whereby the resistance of said electrical component is determined directly by the value of said new current, and no error is introduced by the conduction of any semiconductor device connected to said electrical component.

2. The method of measuring the resistance of a selected electrical component while connected in a circuit containing one or more semiconductor transistor and diode devices which have a predetermined minimum threshold voltage for current conduction, said method comprising the steps of
   driving a constant current through a direct current ammeter to produce a full scale deflection reading on said ammeter and a voltage across said ammeter which is less than the minimum threshold voltage required to turn on any of said semiconductor devices connected in said circuit with the electrical component to be measured,
   then placing the electrical component in parallel with said ammeter, and measuring the new current flowing through said ammeter while driving said constant current through the parallel combination of said ammeter and said component;
   whereby, measurement of the resistance of said component is unaffected by any of the semiconductor transistor and diode devices connected with said component.

3. The method of measuring the resistance of an electrical component comprising the steps of
   connecting a high output impedance constant current source to current measuring means of low impedance,
   driving a constant current through said current measuring means to produce a voltage across said means which is too small to turn on any semiconductor device connected in circuit with said electrical component,
   placing the electrical component to be measured in parallel with said current measuring means, and
   measuring the new current flowing through said means;
   whereby the resistance of said electrical component is determined directly by the value of said new current, and no error is introduced by any semiconductor device connected to said electrical component.

4. The method of measuring the resistance of an electrical component in a circuit containing one or more semiconductor transistor and diode devices, said method comprising the steps of
   driving a constant current through a direct current ammeter to produce a full scale deflection reading on said ammeter and a voltage across said ammeter which is too small to turn on any of said semiconductor devices connected in said circuit with the electrical component to be measured,
   then placing the electrical component in parallel with said ammeter, and,
   measuring the new current flowing through said ammeter;
   whereby, measurement of the resistance of said component is unaffected by any of the semiconductor transistor and diode devices connected with said component.

5. The method of measuring the resistance of a selected electrical component comprising the steps of:
   (a) applying a current from a constant current source to a current measuring means of impedance $R_o$ and measuring the current $I_o$ flowing through said means, (b) placing the electrical component having a resistance $R_x$ to be measured in parallel with said current measuring means, (c) measuring the new current $I_M$ flowing through said means, and (d) obtaining the resistance $R_x$ of said electrical component from the following expression $$R_x = R_o \frac{I_M}{I_o - I_M}$$

6. The method of measuring the resistance of a selected electrical component comprising the steps of:

(a) applying a current $I_o$ from a constant current source to a current measuring means of impedance of $R_o$, (b) placing a calibrating element having a variable known resistance $R_V$ in parallel with said current measuring means, (c) calibrating said current measuring means to read the values of resistance $R_V$ of said variable known resistance by using the following formula $$I_M = I_o \frac{R_V}{R_o + R_V}$$

where $I_M$ is the current flowing through said means, (d) removing said calibrating element and placing an electrical component having a resistance $R_x$ to be measured in parallel with said current measuring means, and (e) obtaining the resistance $R_x$ of said electrical component from said calibrated current measuring means while said source applies said current $I_o$ to the parallel combination of said means and said source.

7. The method of measuring the resistance of a selected electrical component while connected in-circuit with one or more semiconductor devices which have a predetermined minimum threshold voltage for current conduction comprising the steps of:

(a) applying a current from a constant current source to a current measuring means of low impedance $R_o$, (b) adjusting the current through said measuring means to a predetermined value $I_o$ to produce a voltdrop across said measuring means less than the minimum threshold voltage required to turn on any semiconductor device connected in circuit with said electrical component, (c) placing the electrical component having a resistance $R_x$ to be measured in parallel with said current measuring means, (d) measuring the new current $I_M$ flowing through said means while said source applies said current $I_o$ to the parallel combination of said means and said component, and (e) determining the resistance $R_x$ of said electrical component from the following expression $$I_M = I_o \frac{Rx}{R_o + Rx}$$

or $$Rx = R_o \frac{I_M}{I_o - I_M}$$

8. An electrical circuit for measuring the resistance $R_x$ of a selected electrical component comprising:

(a) a source of substantially constant current delivering an output current $I_o$, (b) a current measuring means connected across said source of current and having an impedance $R_o$, and (c) means for connecting a selected electrical component having a resistance $R_x$ to be measured in parallel with said current measuring means while said source applies said current $I_o$ to the parallel combination of said means and said component, whereby said current measuring means measures a current $I_o$ before an electrical component which is to be measured is connected in parallel with said current measuring means and measures a new current $I_M$ when said electrical component is connected in parallel with said current measuring means, said current measuring means being calibrated to provide the resistance measurement of said electrical component in accordance with the following expression:

$$R_x = R_o \frac{I_M}{I_o - I_M}$$

9. The circuit of claim 8 for measuring the resistance $R_x$ of a selected electrical component while connected in circuit with one or more semiconductor devices, which have a predetermined minimum threshold voltage for current conduction, in which said current measuring means has a sufficiently low impedance $R_o$ so that the voltage drop across it when conducting the current $I_o$ is less than the minimum threshold voltage required for current conduction by any semiconductor device connected in the circuit with said electrical component.

10. The circuit of claim 9 in which said source (a) of constant current provides a current output $I_o$ which is adjustable, and said current measuring means (b) provides a predetermined reading with an adjusted current $I_o$ of said source, said means (b) having a value of resistance providing a voltage drop across it when said adjusted current $I_o$ flows therethrough which is less than the minimum threshold voltage required for current conduction by any semiconductor device connected in circuit with said electrical component.

11. The circuit of claim 10 in which the constant current source comprises a transistor, having an emitter, base and collector, in a common base configuration, adjustable input circuit means connected between said base and emitter for forward biasing said emitter, and a unidirectional potential source connected at one end to said base for reverse biasing said collector, said current measuring means being connected between said collector and said potential source.

12. The circuit of claim 10 in which said current measuring means (b) is a D.C. ammeter which at its full scale deflection current reading has a voltage drop across it which is less than the said threshold voltage needed to turn on any semiconductor connected in the circuit with said electrical component.

13. The circuit of claim 11 in which said input circuit means comprises a unidirectional potential source series connected to a variable resistor for adjusting the forward bias on said emitter.

14. The circuit of claim 11 in which said adjustable input circuit means for forward biasing said emitter comprises a battery with one terminal connected to the base of said transistor, a potentiometer across said battery having an adjustable tap for obtaining a variable voltage output from said potentiometer, a selector switch having its common terminal connected to said adjustable tap and having a plurality of switch positions and output terminals, one output terminal corresponding to each switch position, and a plurality of resistors, each connected at one end to the emitter of said transistor and at the other end to a different one of said switch output terminals.

15. The circuit of claim 14 in which said current measuring means (b) provides a full scale reading at an adjusted current $I_o$ of said source (a), said means (b) has a value of resistance providing a voltage drop across it, when the full scale current flows through it, which is less than the minimum threshold voltage for current conduction of any semiconductor device connected in circuit with said electrical component, and said means (c) connects said electrical component to have its resistance measured to said collector and to both said unidirectional potential source and said current measuring means while maintaining constant the adjusted current $I_o$ of said source (a), whereby said means (b) provides a reading of the resistance of said component.

16. The circuit of claim 15 in which said current measuring means (b) comprises a direct current ammeter, one end of which is connected to said unidirectional potential source, a potentiometer having a variable voltage output tap, one end of which potentiometer is connected to the other end of said ammeter, a plurality of resistors, and selector switch means for connecting some of said resistors between said potentiometer tap and said unidirectional potential source, and for connecting others of said resistors between said tap and the collector of said transistor, whereby said ammeter is adapted to read resistance in a plurality of different resistance ranges.

References Cited

UNITED STATES PATENTS

| | | | |
|---|---|---|---|
| 2,188,588 | 1/1940 | Antranikian | 324—62 |
| 2,891,219 | 6/1959 | Camp | 324—62 |
| 2,981,884 | 4/1961 | Tighe | 323—22 |
| 2,995,704 | 8/1961 | Norgaard | 324—62 |
| 3,025,466 | 3/1962 | Beers | 324—62 |
| 3,204,179 | 8/1965 | Fuller | 324—62 X |
| 3,227,953 | 1/1966 | Cerveny | 324—62 |

FOREIGN PATENTS

| | | |
|---|---|---|
| 441,837 | 10/1934 | Great Britain. |
| 637,738 | 5/1950 | Great Britain. |

OTHER REFERENCES

Buchbaum: Constant Current Testing, Semiconductor Products, February 1960, pp. 47–48.

Gerstle: Measurement of Meter Resistance, Electronics World, 1960, p. 82.

RUDOLPH V. ROLINEC, *Primary Examiner.*

E. E. KUBASIEWICZ, *Assistant Examiner.*

PO-1050
(5/69)

UNITED STATES PATENT OFFICE
CERTIFICATE OF CORRECTION

Patent No. 3,440,530                    Dated April 22, 1969

Inventor(s) Bernard Reich, Michael A. Benanti and William R. Orloff

It is certified that error appears in the above-identified patent and that said Letters Patent are hereby corrected as shown below:

Column 1, lines 5 through 8, should read -- Bernard Reich, Yonkers, Michael A. Benanti, Mamaroneck, and William R. Orloff, Tarrytown, N.Y., assignors by mesne assignments, to American Electronic Laboratories, Inc., Colmar, Pennsylvania, a corporation of Pennsylvania -- . Column 5, line 44, in Claim 7 "volt-" should read -- voltage -- .

Signed and sealed this 23rd day of March 1971.

(SEAL)
Attest:

EDWARD M. FLETCHER, JR.                 WILLIAM E. SCHUYLER, JR.
Attesting Officer                       Commissioner of Patents